United States Patent
Xu

(10) Patent No.: US 10,540,074 B2
(45) Date of Patent: Jan. 21, 2020

(54) METHOD AND TERMINAL FOR PLAYING MEDIA

(71) Applicant: Huawei Technologies Co., Ltd., Shenzhen (CN)

(72) Inventor: Jie Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 213 days.

(21) Appl. No.: 15/109,588

(22) PCT Filed: May 28, 2014

(86) PCT No.: PCT/CN2014/078634
§ 371 (c)(1),
(2) Date: Jul. 1, 2016

(87) PCT Pub. No.: WO2015/180067
PCT Pub. Date: Dec. 3, 2015

(65) Prior Publication Data
US 2016/0328134 A1    Nov. 10, 2016

(51) Int. Cl.
G06F 3/0484 (2013.01)
G11B 27/034 (2006.01)
G06F 3/0488 (2013.01)
G06F 3/0346 (2013.01)
G06F 3/16 (2006.01)
G11B 27/00 (2006.01)

(52) U.S. Cl.
CPC ........ *G06F 3/04847* (2013.01); *G06F 3/0346* (2013.01); *G06F 3/04883* (2013.01); *G06F 3/04886* (2013.01); *G06F 3/165* (2013.01); *G06F 3/167* (2013.01); *G11B 27/007* (2013.01); *G11B 27/034* (2013.01); *G06F 2203/04808* (2013.01)

(58) Field of Classification Search
CPC .. G06F 3/04847; G06F 3/0346; G06F 3/0488; G06F 3/04883; G06F 3/04847; G06F 3/165
See application file for complete search history.

(56) References Cited

U.S. PATENT DOCUMENTS

| | | |
|---|---|---|
| 2006/0218187 A1 | 9/2006 | Plastina et al. |
| 2007/0011150 A1* | 1/2007 | Frank ................ G06F 17/30241 |
| 2009/0300530 A1* | 12/2009 | Falchuk ............... G06F 3/04883 715/764 |
| 2010/0140070 A1* | 6/2010 | Simard ................ G04C 23/347 200/33 R |
| 2010/0257447 A1 | 10/2010 | Kim et al. |

(Continued)

FOREIGN PATENT DOCUMENTS

| | | |
|---|---|---|
| CN | 1797392 A | 7/2006 |
| CN | 101465146 A | 6/2009 |

(Continued)

*Primary Examiner* — Angie Badawi
(74) *Attorney, Agent, or Firm* — Slater Matsil, LLP

(57) ABSTRACT

Embodiments of the present disclosure provide a method for playing media, including: enabling a function of setting a quantity of play times; detecting an input command of a user, and determining a quantity of play times of media according to the input command; and playing the media according to the quantity of play times. The embodiments of the present disclosure further provide a terminal for playing media.

20 Claims, 6 Drawing Sheets

(56) References Cited

U.S. PATENT DOCUMENTS

| | | | |
|---|---|---|---|
| 2011/0167347 A1* | 7/2011 | Joo | G06F 3/04847 |
| | | | 715/716 |
| 2013/0110268 A1* | 5/2013 | Matsuura | G06F 3/04883 |
| | | | 700/94 |
| 2013/0132204 A1 | 5/2013 | Ochiai et al. | |
| 2014/0035861 A1 | 2/2014 | Soo et al. | |
| 2014/0059474 A1* | 2/2014 | Cho | G06F 3/0488 |
| | | | 715/776 |
| 2015/0248213 A1* | 9/2015 | Postal | G06F 3/04817 |
| | | | 715/835 |

FOREIGN PATENT DOCUMENTS

| | | |
|---|---|---|
| CN | 102073437 A | 5/2011 |
| CN | 103076979 A | 5/2013 |
| CN | 103123795 A | 5/2013 |
| CN | 103257825 A | 8/2013 |
| CN | 103309601 A | 9/2013 |
| JP | 2002116858 A | 4/2002 |
| JP | 2006277917 A | 10/2006 |
| JP | 2012014604 A | 1/2012 |
| JP | 2012159820 A | 8/2012 |

\* cited by examiner

METHOD AND TERMINAL FOR PLAYING MEDIA

CROSS-REFERENCE TO RELATED APPLICATIONS

This patent application is a national phase filing under section 371 of PCT/CN2014/078634, filed on May 28, 2014, which is hereby incorporated herein by reference in its entirety.

TECHNICAL FIELD

The present disclosure relates to the field of communications technologies, and in particular embodiments, to a method and terminal for playing media.

BACKGROUND

With the rapid development of terminals, increasing functions, such as taking a photo, surfing the Internet, playing a video, and playing music, are integrated on the terminals. Media play capability of an existing terminal is increasingly strong, media play effect is improving, some terminals have good portability, and therefore increasingly large quantities of users are using a terminal to play media.

In a process in which a user is playing media, if the user hears or watches media that the user wants to hear or watch more than once, an operation on a terminal is relatively complex. An example in which a user listens to a song is used for the following description: In the prior art, the user needs to enter a music application, and tap a music play mode to switch the music play mode to a single cycle mode. In this way, a song that the user likes can be repeatedly played, but is endlessly repeated. When the repeated play needs to be stopped, the user needs to perform an operation again, and a procedure is relatively complex. Another manner as follows. After the song that the user likes is played, the user taps a previous song to return to and replay the song that the user likes. If the user wants to listen to the song again after the play is completed, the user needs to repeat the foregoing operation, which brings great inconvenience to the user. Therefore, operations of an existing method and terminal for playing media are not convenient enough.

SUMMARY

Embodiments of the present disclosure provide a method and terminal for playing media, which can resolve a problem that a method for playing media on a terminal is imperfect and not convenient.

A first aspect of the embodiments of the present disclosure provides a method for playing media, including:
enabling a function of setting a quantity of play times;
detecting an input command of a user, and determining a quantity of play times of media according to the input command; and
playing the media according to the quantity of play times.

In an implementation of the first aspect, the media include:
an audio file or a video file that is currently being played by a terminal; and
the playing the media according to the quantity of play times includes:
playing the audio file or the video file that is currently being played by the terminal, until the quantity of play times is reached.

In an implementation of the first aspect, the media include:
a selected to-be-played audio file or a selected to-be-played video file; and
the playing the media according to the quantity of play times includes:
playing the selected to-be-played audio file or the selected to-be-played video file, until the quantity of play times is reached.

With reference to the first aspect, in an implementation, before the enabling a function of setting a quantity of play times, the method further includes at least one of the following steps:
detecting a preset command that is input by the user by using a voice;
detecting that a movement track of the terminal is in line with a preset track;
detecting a tap operation performed by the user on a preset area of a touch display screen of the terminal;
detecting a knock operation performed by the user on the terminal;
detecting a slide operation performed by the user on a preset area of a touch display screen of the terminal;
detecting that duration for a selection operation performed by the user on a preset area of a touch display screen of the terminal reaches first preset duration;
detecting a pressing operation performed by the user on a specified key of the terminal; and
detecting that a quantity of fingers of the user that touch a preset area of a touch display screen of the terminal reaches a preset quantity.

With reference to the first aspect, in an implementation, the detecting an input command of a user, and determining a quantity of play times of media according to the input command includes any one of the following steps:
detecting a quantity of play times that is input by the user by using a voice, and determining that the quantity of play times of the media is the quantity of play times that is input by using a voice;
detecting the quantity of fingers of the user that touch the preset area of the touch display screen of the terminal, and determining that the quantity of play times of the media is the quantity of fingers;
detecting a quantity of times of shaking the terminal by the user, and determining that the quantity of play times of the media is the quantity of times of shaking the terminal by the user;
detecting a quantity of times of tapping the preset area of the touch display screen of the terminal by the user, and determining that the quantity of play times of the media is the quantity of tap times;
detecting a track of the slide operation performed by the user on the preset area of the touch display screen of the terminal, and determining the quantity of play times of the media according to a length of the track of the slide operation or according to a length and a direction that are of the track;
detecting duration for selection performed by the user on the preset area of the touch display screen of the terminal, and determining the quantity of play times of the media according to the duration for selection; and
detecting a distance between two points selected by the user on the preset area of the touch display screen of the terminal, and determining the quantity of play times of the media according to the distance.

With reference to the first aspect, in an implementation, before the enabling a function of setting a quantity of play times, the method further includes:

detecting that duration for a selection operation performed by the user on a preset area of a touch display screen of the terminal reaches first preset duration; and the detecting an input command of a user, and determining a quantity of play times of media according to the input command includes:

continuously detecting the selection operation performed by the user on the preset area of the touch display screen of the terminal, and determining the quantity of play times of the media according to the duration for the selection operation.

With reference to the first aspect, in an implementation, before the enabling a function of setting a quantity of play times, the method further includes:

detecting a slide operation performed by the user on a preset area of a touch display screen of the terminal; and the detecting an input command of a user, and determining a quantity of play times of media according to the input command includes:

continuously detecting the slide operation performed by the user on the preset area of the touch display screen of the terminal; and adjusting the quantity of play times of the media according to a direction and a length that are of a track of the slide operation.

With reference to the first aspect, in an implementation, after the determining a quantity of play times of media, the method further includes displaying the quantity of play times of the media.

With reference to the first aspect, in an implementation, when the media are being played according to the quantity of play times, if a cancellation instruction input by the user is received, playing of the media that is performed according to the quantity of play times is stopped.

With reference to the first aspect, in an implementation, after the playing the media according to the quantity of play times, or after the cancellation instruction input by the user is received, and playing of the media that is performed according to the quantity of play times is stopped, the method further includes playing media in a media list according to the media list and a preset play rule.

A second aspect of the embodiments of the present disclosure provides a terminal for playing media, including a processor and a computer-readable storage medium storing a plurality of program modules to be executed by the processor. The plurality of program modules include:

an enabling module configured to enable a function of setting a quantity of play times;

a first detection module configured to detect an input command of a user, and determine a quantity of play times of media according to the input command; and a play module configured to play the media according to the quantity of play times.

In an implementation of the second aspect, the media include:

an audio file or a video file that is currently being played by the terminal; and the play module is configured to:

play the audio file or the video file that is currently being played by the terminal, until the quantity of play times is reached.

In an implementation of the second aspect, the media include:

a selected to-be-played audio file or a selected to-be-played video file; and the play module is configured to:

play the selected to-be-played audio file or the selected to-be-played video file, until the quantity of play times is reached.

With reference to the second aspect, in an implementation, the terminal further includes:

a second detection module configured to: before the enabling module enables the function of setting a quantity of play times, perform at least one of the following steps:

detecting a preset command that is input by the user by using a voice;

detecting that a movement track of the terminal is in line with a preset track;

detecting a tap operation performed by the user on a preset area of a touch display screen of the terminal;

detecting a knock operation performed by the user on the terminal;

detecting a slide operation performed by the user on a preset area of a touch display screen of the terminal;

detecting that duration for a selection operation performed by the user on a preset area of a touch display screen of the terminal reaches first preset duration;

detecting a pressing operation performed by the user on a specified key of the terminal; and detecting that a quantity of fingers of the user that touch a preset area of a touch display screen of the terminal reaches a preset quantity.

With reference to the second aspect, in an implementation, the first detection module is configured to perform any one of the following steps:

detecting a quantity of play times that is input by the user by using a voice, and determining that the quantity of play times of the media is the quantity of play times that is input by using a voice;

detecting the quantity of fingers of the user that touch the preset area of the touch display screen of the terminal, and determining that the quantity of play times of the media is the quantity of fingers;

detecting a quantity of times of shaking the terminal by the user, and determining that the quantity of play times of the media is the quantity of times of shaking the terminal by the user;

detecting a quantity of times of tapping the preset area of the touch display screen of the terminal by the user, and determining that the quantity of play times of the media is the quantity of tap times;

detecting a track of the slide operation performed by the user on the preset area of the touch display screen of the terminal, and determining the quantity of play times of the media according to a length of the track of the slide operation or according to a length and a direction that are of the track;

detecting duration for selection performed by the user on the preset area of the touch display screen of the terminal, and determining the quantity of play times of the media according to the duration for selection; and detecting a distance between two points selected by the user on the preset area of the touch display screen of the terminal, and determining the quantity of play times of the media according to the distance.

With reference to the second aspect, in an implementation, before the enabling module enables the function of setting a quantity of play times, the second detection module is configured to:

detect that duration for a selection operation performed by the user on a preset area of a touch display screen of the terminal reaches first preset duration; and the first detection module is configured to:

continuously detect the selection operation performed by the user on the preset area of the touch display screen of the terminal, and determine the quantity of play times of the media according to the duration for the selection operation.

With reference to the second aspect, in an implementation, before the enabling module enables the function of setting a quantity of play times, the second detection module is configured to:

detect a slide operation performed by the user on a preset area of a touch display screen of the terminal; and the first detection module is configured to:

continuously detect the slide operation performed by the user on the preset area of the touch display screen of the terminal; and adjust the quantity of play times of the media according to a direction and a length that are of a track of the slide operation.

With reference to the second aspect, in an implementation, the terminal further includes:

a display module configured to: after the first detection module determines the quantity of play times of the media, display the quantity of play times of the media.

With reference to the second aspect, in an implementation, the terminal further includes:

a cancellation module configured to: when the play module is playing the media according to the quantity of play times, if a cancellation instruction input by the user is received, stop playing of the media that is performed according to the quantity of play times.

With reference to the second aspect, in an implementation, after the play module plays the media according to the quantity of play times, or after the cancellation instruction input by the user is received, and the cancellation module stops playing of the media that is performed according to the quantity of play times, the play module is further configured to:

play media in a media list according to the media list and a preset play rule.

A third aspect of the embodiments of the present disclosure provides a terminal for playing media, which may include:

a processor, configured to enable a function of setting a quantity of play times;

an input apparatus, configured to detect an input command of a user, where the processor is further configured to determine a quantity of play times of media according to the input command, and instruct a media output apparatus to play the media according to the quantity of play times; and the media playing apparatus, configured to play the media according to the quantity of play times.

In an implementation of the third aspect, the media include:

an audio file or a video file that is currently being played by the terminal; and the media playing apparatus is configured to:

play the audio file or the video file that is currently being played by the terminal, until the quantity of play times is reached.

In an implementation of the third aspect, the media include:

a selected to-be-played audio file or a selected to-be-played video file; and the media playing apparatus is configured to:

play the selected to-be-played audio file or the selected to-be-played video file, until the quantity of play times is reached.

With reference to the third aspect, in an implementation, the input apparatus is further configured to:

before the processor enables the function of setting a quantity of play times, perform at least one of the following steps:

detecting a preset command that is input by the user by using a voice;

detecting that a movement track of the terminal is in line with a preset track;

detecting a tap operation performed by the user on a preset area of a touch display screen of the terminal;

detecting a knock operation performed by the user on the terminal;

detecting a slide operation performed by the user on a preset area of a touch display screen of the terminal;

detecting that duration for a selection operation performed by the user on a preset area of a touch display screen of the terminal reaches first preset duration;

detecting a pressing operation performed by the user on a specified key of the terminal; and detecting that a quantity of fingers of the user that touch a preset area of a touch display screen of the terminal reaches a preset quantity.

With reference to the third aspect, in an implementation, the input apparatus is configured to detect a quantity of play times that is input by the user by using a voice, and the processor is configured to determine that the quantity of play times of the media is the quantity of play times that is input by using a voice; or the input apparatus is configured to detect the quantity of fingers of the user that touch the preset area of the touch display screen of the terminal, and the processor is configured to determine that the quantity of play times of the media is the quantity of fingers; or the input apparatus is configured to detect a quantity of times of shaking the terminal by the user, and the processor is configured to determine that the quantity of play times of the media is the quantity of times of shaking the terminal by the user; or the input apparatus is configured to detect a quantity of times of tapping the preset area of the touch display screen of the terminal by the user, and the processor is configured to determine that the quantity of play times of the media is the quantity of tap times; or the input apparatus is configured to detect a track of the slide operation performed by the user on the preset area of the touch display screen of the terminal, and the processor is configured to determine the quantity of play times of the media according to a length of the track of the slide operation; or the input apparatus is configured to detect duration for selection performed by the user on the preset area of the touch display screen of the terminal, and the processor is configured to determine the quantity of play times of the media according to the duration for selection; or the input apparatus is configured to detect a distance between two points selected by the user on the preset area of the touch display screen of the terminal, and the processor is configured to determine the quantity of play times of the media according to the distance.

With reference to the third aspect, in an implementation, the input apparatus is configured to:

detect that duration for a selection operation performed by the user on a preset area of a touch display screen of the terminal reaches first preset duration;

the processor is configured to:

after the input apparatus detects that the duration for the selection operation performed by the user on the preset area of the touch display screen of the terminal reaches the first preset duration, enable the function of setting a quantity of play times;

the input apparatus is configured to:

continuously detect the selection operation performed by the user on the preset area of the touch display screen of the terminal; and the processor is configured to:

determine the quantity of play times of the media according to the duration for the selection operation.

With reference to the third aspect, in an implementation, the input apparatus is configured to:

detect a slide operation performed by the user on a preset area of a touch display screen of the terminal;

the processor is configured to:

after the input apparatus detects the slide operation performed by the user on the preset area of the touch display screen of the terminal, enable the function of setting a quantity of play times;

the input apparatus is configured to:

continuously detect the slide operation performed by the user on the preset area of the touch display screen of the terminal; and the processor is configured to:

adjust the quantity of play times of the media according to a direction and a length that are of a track of the slide operation or according to a length and a direction that are of the track.

With reference to the third aspect, in an implementation, the terminal further includes:

a display screen, configured to: after the processor determines the quantity of play times of the media, display the quantity of play times of the media.

With reference to the third aspect, in an implementation, the input apparatus is further configured to: in response to the media playing apparatus playing the media according to the quantity of play times, receive a cancellation instruction input by the user, wherein the processor is further configured to instruct the media playing apparatus to stop playing of the media that is performed according to the quantity of play times, and wherein the media playing apparatus is further configured to stop, according to the instruction of the processor, playing of the media that is performed according to the quantity of play times.

With reference to the third aspect, in an implementation, after the media playing apparatus plays the media according to the quantity of play times, or after the input apparatus receives the cancellation instruction input by the user, and the processor instructs the media playing apparatus to stop playing of the media that is performed according to the quantity of play times, the media playing apparatus is further configured to play media in a media list according to the media list and a preset play rule.

By implementing the embodiments of the present disclosure, a function of setting a quantity of play times is configured on a terminal, a quantity of play times of media is determined according to a detected input command of a user, and finally the media is played according to the determined quantity of play times, which improves an existing method for playing media on a terminal, enables the quantity of play times of the media to be directly and conveniently set, and enhances convenience and usability of the terminal.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

Figure 1:
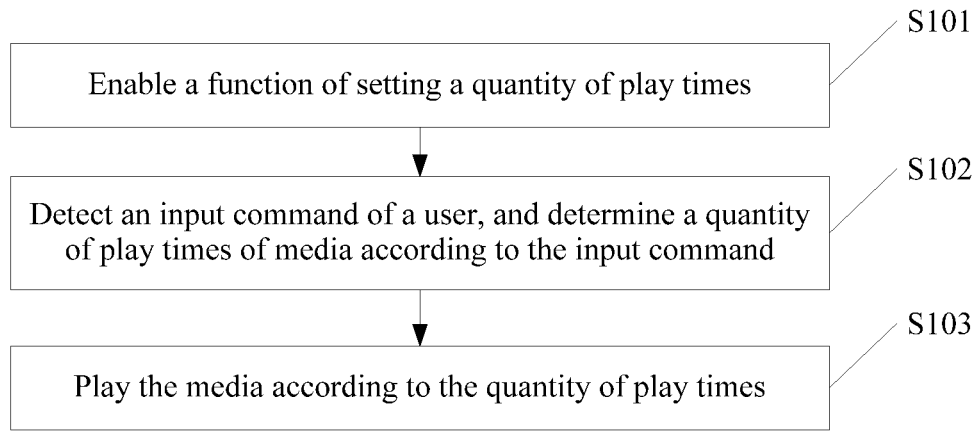
FIG. 1 is a schematic flowchart of a first embodiment of a method for playing media according to the present disclosure.

The following clearly and completely describes the technical solutions in embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

A terminal in the embodiments of the present disclosure may include a device, such as a personal computer (PC for short), a tablet computer, a mobile phone, a PDA (personal digital assistant), an e-reader, a laptop computer, or an in-vehicle terminal.

The foregoing terminal includes an input apparatus and an output apparatus. The input apparatus includes but is not limited to a display screen, a touchscreen, a soft keyboard, a virtual control, a physical keyboard, a function key (such as a volume control key or an on/off key), a trackball, a mouse, a joystick, a camera, a microphone, and an input apparatus that can be implemented by using future technologies. The output apparatus includes but is not limited to a display screen, a touchscreen, a loudspeaker, and the like, and an output apparatus that can be implemented by using future technologies.

Media in the embodiments of the present disclosure include an audio file, a video file, a dynamic image, or an animation. The audio file is a file that includes music, voice, a special sound effect, and the like. The video file includes a series of images, may include a sound, or may not include a sound. The media may be media currently being played by the terminal or selected to-be-played media. That is, in the embodiments of the present disclosure, when the media are being played, a quantity of play times of the media may be set to M, and after the setting, the media further need to be played for M−1 times; or media or several media may be selected before media play, a quantity of play times of the media may be set to M, and after the setting, the selected media or the several selected media are immediately and continuously played for M times, or when the selected media or the several selected media are played subsequently, the selected media or the several selected media are continuously played for M times, where M is an integer greater than 0. Optionally, in addition to continuously playing the selected media, the selected media may also be discontinuously played until M times is reached. Continuous playing in the embodiments of the present disclosure refers to playing media over and over again from beginning to end after the media are played. For continuous play of multiple media, each media may be separately and continuously played. For example, in a play list, five media (indexed 1, 2, 3, 4, and 5) need to be played in order, and if the following is set: media 2 is to be played twice, and media 4 is to be played for three times, content to be successively played may be media 1, 2, 2, 3, 4, 4, 4, and 5.

Discontinuous playing in the embodiments of the present disclosure may be intercutting one or more other media between M times of playing selected media, that is, one or more other media may be intercut between two adjacent times of playing the selected media; or discontinuous playing may be randomly intercutting one or more other media. For example, intercutting another media between playing the selected media for the first time and playing the selected media for the second time, and then playing the selected media for the third time and the fourth time. The intercut media may be randomly selected media or another media that follows selected media in a play list. For example, in a play list, five media 1, 2, 3, 4, and 5 need to be played in order, and if the following is set: the media 2 is to be played twice, and the media 4 is to be played for three times, content to be played successively may be media 1, 2, 3, 2, 4, 5, 4, and 4, or 1, 2, 4, 2, 3, 4, 5, and 4, or the like. It may be understood that a person skilled in the art may also figure out another discontinuous playing manner according to the foregoing description.

According to an instruction of a processor, a media playing apparatus may acquire to-be-played media from the processor or a memory, perform corresponding processing (for example, decoding or digital-to-analog conversion) on the to-be-played media, and generate a sound signal and/or a video signal that are/is corresponding to the media to perform playing. To play a video, a media output apparatus may include a chip that has a media data processing function and an output apparatus (for example, a display screen or a touchscreen) that has an image output function. If the video includes a sound, the media output apparatus may further include and have an output apparatus (for example, a loudspeaker) with an audio output function. If only audio needs to be played, a media output apparatus may include a chip that has a media data processing function and an output apparatus that has an audio output function; optionally, the media output apparatus may further include an output apparatus with an image output function, for displaying content such as an audio play interface.

A function of setting a quantity of play times is a function used by a user to set a quantity of play times of media. When the function is enabled, the user may set the quantity of play times of the media in multiple input manners such as voice and touch. Set media may be media currently being played by a terminal. That is, in a media play process, a quantity of play times of the media is set to M, and after the setting is completed, after this play ends, the media may continue to be continuously or discontinuously played for M−1 times. Alternatively, set media may also be media that are to be played. That is, before the media are played, a quantity of play times of the media may be preset, and if the quantity of play times of the media is set to M, when it is the turn to play the media subsequently, the media may be continuously or discontinuously played for M times.

In the embodiments of the present disclosure, detecting voice input of the user to the terminal refers to a step where the terminal acquires a user voice by using an input device such as a microphone that can receive a user voice, processes and identifies the acquired voice by using a device such as a processor, and determines whether the voice includes information related to a preset command or a quantity of play times. For specific implementation thereof, reference may be made to the prior art related to speech recognition, and details are not described herein again. When it is detected that the user inputs the preset command, the function of setting a quantity of play times may be enabled. Optionally, when a quantity of play times that is input by the user by using a voice is detected, it may further be determined that the quantity of play times of the media is the quantity of play times that is input by using the voice.

In the embodiments of the present disclosure, detecting whether a movement track of the terminal is in line with a preset track refers to a step where the terminal detects the movement track of the terminal by using one or more types of sensors, and then determines whether the movement track is the preset track. For example, the preset track is a vertically downward movement (e.g., when the user throws the terminal downwards), a free fall after a vertically upward movement (e.g., when the user throws the terminal upwards), a back-and-forth movement in a horizontal direction (e.g., when the user shakes the terminal horizontally), or a back-and-forth movement in a vertical direction (e.g., when the user shakes the terminal vertically). If the movement track of the terminal is in line with the preset track, the function of setting a quantity of play times may be enabled. The foregoing method for detecting the movement track of the terminal may be implemented in multiple manners in the prior art, which is not limited in the embodiments of the present disclosure.

Detecting a tap operation performed by the user on a preset area of a touch display screen of the terminal and a quantity of times of tapping the preset area refers to a step where the terminal detects, according to a related parameter change (for example, a capacitance or resistance change) of the preset area of the touch display screen, the tap operation performed by the user on the preset area of the touch display screen. The quantity of tap times of the user may be obtained by collecting statistics on the related parameter change (for example, a quantity of times of capacitance or resistance changes) of the preset area. Optionally, whether the quantity of tap times matches a quantity of times of triggering to enable the function of setting a quantity of play times is determined, and if it matches, the function of setting a quantity of play times is enabled. Optionally, a quantity of play times of media may also be set according to the quantity of tap times. The preset area may be a specified area on a display interface of a media play application, for example, an area above or below a play button, or a top edge, a bottom edge, a left edge, or a right edge of the touch display screen, or may be a specified area on a desktop of the terminal or a lock screen interface of the terminal, for example, any area without an application icon on the desktop of the terminal, or any area on the lock screen interface of the terminal. The foregoing preset area for tapping may be an area that has no conflict with another application or function and that is on a current display interface of the terminal; or a higher or lower priority may be configured for a media application, and when a conflict exists between an area for tapping and another application or function, responding and processing are performed according to the priority, which is not limited in the embodiments of the present disclosure.

Detecting a knock operation performed by the user on the terminal and a quantity of knock times refers to a step where the terminal detects vibration of the terminal by using one or more types of sensors, and then determines whether a quantity of vibration times reaches the quantity of times of triggering to enable the function of setting a quantity of play times. A knocked position may be a housing or a display screen of the terminal. If a quantity of vibration times that is detected by a sensor reaches the quantity of times of triggering to enable the function of setting a quantity of play times, the function of setting a quantity of play times may be enabled. Optionally, a quantity of play times of media may also be set according to the quantity of knock times. The foregoing method for detecting vibration of the terminal may be implemented in multiple manners in the prior art, which is not limited in the embodiments of the present disclosure.

Detecting a slide operation performed by the user on a preset area of a touch display screen of the terminal refers to a step where the terminal detects, according to a parameter change (for example, a capacitance or resistance change) of a touched position on the touch display screen, a touch operation performed by the user on the touch display screen, and then determines, according to whether an area whose capacitance or resistance changes are continuous, whether the touch operation is a slide operation. If it is determined that the touch operation is a slide operation and a slide length reaches a specific length, the function of setting a quantity of play times may be enabled. Optionally, a quantity of play times may further be set according to a length of a track of the slide operation or according to a length and a direction that are of a track of the slide operation. The preset area may be a specified area on a display interface of the media play application, for example, an area of a play button, or an area above or below a play button, or may be a specified area on a desktop or a lock screen interface of the terminal. The slide direction may extend in any direction. For example, the function of setting a quantity of play times may be enabled after a rightward slide above the play button for a specific distance, or the function of setting a quantity of play times may be enabled after a leftward slide on any area on the desktop or lock screen interface of the terminal for a specific length. After the function of setting a quantity of play times is enabled, a quantity of play times may further be determined according to a direction and a length that are of a slide. For example, the quantity of play times increases in case of a rightward slide, and the quantity of play times increases by 1 in case of a rightward slide for 1 centimeter; the quantity of play times decreases in case of a leftward slide, and the quantity of play times decreases by 1 in case of a leftward slide for 1 centimeter. The foregoing slide area, direction, and length may be implemented in multiple manners, which is not limited in the embodiments of the present disclosure.

Detecting that duration for a selection operation performed by the user on a preset area of a touch display screen of the terminal reaches first preset duration refers to a step where the terminal detects, according to a parameter change (for example, duration for a capacitance or resistance change) of a selected position on the touch display screen, duration for the selection operation performed by the user on the touch display screen, and then determines whether the parameter change (for example, the duration for the capacitance or resistance change) of a selected area reaches the first preset duration. If it reaches, the function of setting a quantity of play times may be enabled. A touch operation may be selection performed by touching (including an operation of selection performed by means of direct touch and an operation of selection performed by means of indirect touch), or the touch display screen is a floating touch display screen, and a corresponding selection operation may be a selection operation performed by means of floating touch. The selected area and duration for the selection operation may be combined according to a requirement, which is not limited in the embodiments of the present disclosure.

Detecting a pressing operation performed by the user on a specified key of the terminal refers to a step where the terminal detects, by detecting an electrical signal change generated when a touch key or a physical key is pressed, whether a specified key is pressed. If the specified key is pressed, the function of setting a quantity of play times may be enabled. Optionally, duration for pressing may also be configured for preventing a misoperation. If a specified key is pressed for the duration, the function of setting a quantity of play times is enabled. The foregoing method for detecting that the specified key of the terminal is pressed may be implemented in multiple manners in the prior art, which is not limited in the embodiments of the present disclosure.

Detecting a quantity of fingers of the user that touch a preset area of a touch display screen of the terminal refers to a step where the terminal detects, according to a parameter change (for example, a capacitance or resistance change and a quantity and changes of capacitance or resistance) of a touched position on the touch display screen, the quantity of fingers of the user that touch the touch display screen. If it is determined that the quantity and a length of fingers for the touch reach a specified quantity, the function of setting a quantity of play times may be enabled. For example, the quantity of fingers for the touch reaches 2, and user-defining of a quantity of play times is enabled; or the quantity of fingers for the touch reaches 3, and user-defining of a quantity of play times is enabled. The touch may be direct touch and indirect touch, a floating touch, or the like. Optionally, user-defining of play times may further be enabled with reference to a touch duration threshold. For example, the quantity of fingers for the touch reaches 2 and duration for the touch reaches two seconds, and user-defining of a quantity of play times is enabled. The foregoing quantity of fingers for the touch or touch time may be implemented in multiple manners, which is not limited in the embodiments of the present disclosure. Optionally, a quantity of play times of media may further be set according to the quantity of fingers that touch the preset area of the touch display screen of the terminal. For example, if it is detected that three fingers touch the preset area of the touch display screen, the quantity of play times of the media is set to 3.

Detecting a quantity of times of shaking the terminal by the user refers to a step where the terminal detects a shake of the terminal and the quantity of shake times by using one or more types of sensors such as an acceleration sensor and a gyro sensor, and then determines whether the quantity of shake times reaches a preset quantity. A direction of shaking may be shaking horizontally, shaking vertically, or shaking back and forth in another two opposite directions. If the quantity of shake times of the terminal reaches the preset quantity, the function of setting a quantity of play times may be enabled. The foregoing method for detecting a terminal shake and the quantity of shake times may be implemented in multiple manners in the prior art, which is not limited in the embodiments of the present disclosure. However, after the function of setting a quantity of play times is triggered, a quantity of play times may also be determined by collecting statistics on the quantity of shake times of the terminal. For example, the quantity of play times increases by 1 in case of one shake from left to right; the quantity of play times decreases by 1 in case of one vertical shake. Certainly, alternatively, the quantity of play times may increase by 1 in case of one leftward shake; the quantity of play times decreases by 1 in case of one rightward shake, and the like. A specific mapping relationship may be implemented in multiple manners, which is not limited in the embodiments of the present disclosure.

Detecting a track of a slide operation performed by the user on a preset area of a touch display screen of the terminal, and determining the quantity of play times of the media according to a length of the track of the slide operation refer to a step where the terminal detects, according to a continuous parameter change (for example, a continuous capacitance or resistance change) of a touched position on the touch display screen, a length of the track of the slide operation performed by the user on the touch display screen. A mapping relationship exists between a length of the track of the slide operation and a quantity of play times, and the quantity of play times of the media may be determined according to a length of the track of the slide operation. Optionally, a direction and a length that are of a track of the slide operation may further be comprehensively considered. The direction of the slide operation may extend or shorten in any direction. For example, a finger continuously slides rightwards above a play button of a media play application, and the quantity of play times increases as a length of a track of the slide operation increases; if the finger slides leftwards, the quantity of play times decreases according to a length of a track of a leftward slide operation. For example, the quantity of play times increases by 1 in case of a rightward slide for 1 centimeter; the quantity of play times decreases by 1 in case of a leftward slide for 1 centimeter. The foregoing method for detecting the length and the direction that are of the track of the slide operation of the terminal may be implemented in multiple manners in the prior art, which is not limited in the embodiments of the present disclosure.

Detecting duration for selection performed by the user in preset area of a touch display screen of the terminal, and determining the quantity of play times of the media according to the duration for selection refer to a step where the terminal detects, according to a parameter change (for example, duration for a capacitance or resistance change) of a selected position on the touch display screen, duration for selection performed by the user on the touch display screen, and determines the quantity of play times according to a preset mapping relationship between the duration for selection and the quantity of play times. For example, a setting may be as follows. The quantity of play times increases as duration for selection increases. For example, when the duration for selection is three seconds, the quantity of play times is 3; when the duration for selection is four seconds, the quantity of play times is 4. A touch operation may be selection performed by touching (including an operation of selection performed by means of direct touch and an operation of selection performed by means of indirect touch), or the touch display screen is a floating touch display screen, and corresponding selection may also be selection performed by means of floating touch. The selected area and duration for selection may be combined according to a requirement, which is not limited in the embodiments of the present disclosure.

Detecting a distance between two points selected by the user on a preset area of a touch display screen of the terminal, and determining the quantity of play times of the media according to the distance refers to a step where the terminal determines, according to a parameter change (for example, a capacitance or resistance change) of the two selected points in a touched position on the touch display screen, positions of the selected points and a distance between two selected points, and then determines the quantity of play times according to a preset relationship between the distance between the two selected points and the quantity of play times. For example, the distance between the two selected points reaches 2 centimeters and is shorter than 3 centimeters, and the quantity of play times is 2; the distance between the two selected points is shorter than 2 centimeters, and the quantity of play times is 1. Before the user completes the operation, the distance between the two selected points may change in real time according to the user operation. The foregoing method for detecting the distance between the two selected points on the touch display screen of the terminal may be implemented in multiple manners in the prior art, which is not limited in the embodiments of the present disclosure.

A trigger condition for enabling the function of setting a quantity of play times may be at least one of the following:

it is detected that a preset command is input by the user by using a voice;

it is detected that a movement track of the terminal is in line with a preset track;

it is detected that a tap operation is performed by the user on a preset area of a touch display screen of the terminal;

it is detected that a knock operation is performed by the user on the terminal;

it is detected that a slide operation is performed by the user on a preset area of a touch display screen of the terminal;

it is detected that duration for a selection operation performed by the user on a preset area of a touch display screen of the terminal reaches first preset duration;

it is detected that a pressing operation is performed by the user on a specified key of the terminal; and it is detected that a quantity of fingers of the user that touch a preset area of a touch display screen of the terminal reaches a preset quantity.

Each of the foregoing detection operations may be separately used as a condition for enabling the function of setting a quantity of play times, or two or more detection operations may be combined and used as a condition for enabling the function of setting a quantity of play times.

For example, an operation of triggering the function of setting a quantity of play times may be touching the preset area of the touch display screen of the terminal for preset duration, and then sliding the preset area of the touch display screen of the terminal to a preset length, or sliding the preset area of the touch display screen of the terminal to a preset length, and then touching the touch display screen of the terminal for preset duration. Alternatively, or additionally, the function of setting a quantity of play times may be triggered by shaking the terminal after knocking the terminal or knocking the terminal after shaking the terminal, or the like. Multiple single operations may be combined to obtain more combined operations, which are not enumerated herein again. Generally, efficiency of detecting a single operation is relatively high, which reduces detection processing time of the terminal. A longer time is required to identify a combined operation, but a terminal can be prevented from making an incorrect response in case of a misoperation of a user. Therefore, an operation for triggering the function of setting a quantity of play times may be selected and configured according to an environment in which the terminal is located and a user habit.

Certainly, a trigger condition may further be automatically enabling the function of setting a quantity of play times when a media play function is enabled, or automatically enabling the function of setting a quantity of play times when each song or video is being played.

In the embodiments of the present disclosure, detecting an input command of a user, and determining a quantity of play times of media according to the input command may be any one of the following steps:

detecting a quantity of play times that is input by the user by using a voice, and determining that the quantity of play times of the media is the quantity of play times that is input by using a voice;

detecting the quantity of fingers of the user that touch the preset area of the touch display screen of the terminal, and determining that the quantity of play times of the media is the quantity of fingers;

detecting a quantity of times of shaking the terminal by the user, and determining that the quantity of play times of the media is the quantity of times of shaking the terminal by the user;

detecting a quantity of times of tapping the preset area of the touch display screen of the terminal by the user, and determining that the quantity of play times of the media is the quantity of tap times;

detecting a track of the slide operation performed by the user on the preset area of the touch display screen of the terminal, and determining the quantity of play times of the media according to a length of the track of the slide operation or according to a length and a direction that are of the track;

detecting duration for selection performed by the user on the preset area of the touch display screen of the terminal, and determining the quantity of play times of the media according to the duration for selection; and detecting a distance between two points selected by the user on the preset area of the touch display screen of the terminal, and determining the quantity of play times of the media according to the distance.

When media are being played, the terminal may determine whether the play is completed by setting a timer. Alternatively, each time media are played, the terminal determines whether the quantity of times is 0 (i.e., the quantity of times is zero); if the quantity of play times is not 0 (i.e., the quantity of times is at least one), the media continue to be played. A method for determining whether the play is completed may be implemented in multiple manners in the prior art, which is not limited in the embodiments of the present disclosure.

Optionally, after the quantity of play times is determined, the determined quantity of play times may be prompted to the user in a manner of voice playing or displaying on the display screen. Alternatively, in a parameter setting process, a quantity of play times that is determined in the process is displayed in real time, so as to guide the user to set the quantity of play times more accurately.

If the operation for triggering the function of setting a quantity of play times is referred to as a first operation, and an operation of setting the quantity of play times is referred to as a second operation. The two operations may be of a same type or different types (operation types may include but are not limited to a voice operation, a touch operation, a shake operation, a tap operation, a knock operation, a selection operation, a slide operation, a key pressing operation, and a multi-finger operation). The two operations may be performed continuously or discontinuously. For example, types of the first operation and the second operation are both touch operations. Duration for touching a preset area of a touch display screen of a terminal reaches first preset duration, for example, two seconds, and a function of setting a quantity of play times is enabled. Then a state of touching the area is kept, that is, duration for touching the same area of the touch display screen of the terminal reaches second preset duration, for example, five seconds, and the terminal may identify the duration for touching, so as to obtain the quantity of play times according to a mapping relationship. For another example, a slide on a preset area of a touch display screen of a terminal reaches a first preset length, for example, 1 centimeter, and a function of setting a quantity of play times is triggered. Then the slide that continues on the preset area of the touch display screen of the terminal in a same direction reaches a second preset length, for example, 3 centimeters, and the terminal may identify a continuous touch distance, so as to obtain the quantity of play times according to a mapping relationship. Certainly, time for performing the first operation by the user and time for performing the second operation by the user may be greater than 0 but less than a preset threshold, that is, a time interval exists between the two operations, provided that the function of setting a quantity of play times is still enabled on the terminal. For example, the preset threshold is three seconds, and after identifying the first operation and enabling the function of setting a quantity of play times, the terminal detects the second operation within three seconds, and the terminal may obtain the quantity of play times; if the terminal does not detect the second operation within three seconds, the terminal may disable a function of a quantity of play times. That the user performs the second operation after three seconds is considered as an invalid operation. That the preset threshold is three seconds is only used as an example for description herein. A specific threshold may be set by a manufacturer or a user, which is not limited in the embodiments of the present disclosure.

With reference to FIG. 1 to FIG. 4, the following describes in detail a method for playing media according to the embodiments of the present disclosure.

Referring to FIG. 1, FIG. 1 is a schematic flowchart of a first embodiment of a method for playing media according to the present disclosure. In this embodiment, the method includes the following steps.

The method shown in FIG. 1 includes S101. Enable a function of setting a quantity of play times.

Optionally, before S101, some trigger conditions may exist, for example, the foregoing various trigger operations performed by the user, or an enabled preset function (for example, media play). After a function of a quantity of play times is set, an initial quantity of play times may not exist, and the quantity of play times may be completely determined by an input command of a user; or an initial quantity of play times may exist, for example, 0 or 1, or a relatively large number (for example, 5), and then the initial quantity of play times is adjusted according to an input command of a user, until the user obtains a desired quantity of play times.

The method shown in FIG. 1 includes S102. Detect an input command of a user, and determine a quantity of play times of media according to the input command.

For a manner of detecting the input command and determining the quantity of play times of the media according to the input command, reference may be made to the foregoing description, and details are not described herein again.

The method shown in FIG. 1 includes S103. Play the media according to the quantity of play times.

The foregoing method may be performed by a terminal, or a specific module in a terminal. For details, reference may be made to a related apparatus embodiment.

A function of setting a quantity of play times is configured on a terminal, a quantity of play times of media is determined according to a detected input command of a user, and finally the media are played according to the determined quantity of play times, which improves an existing method for playing media on a terminal, resolves a problem that an operation of the terminal is relatively complex when same media need to be repeatedly played, enables the quantity of play times of the media to be directly and conveniently set, and enhances convenience and usability of the terminal.

Figure 2:
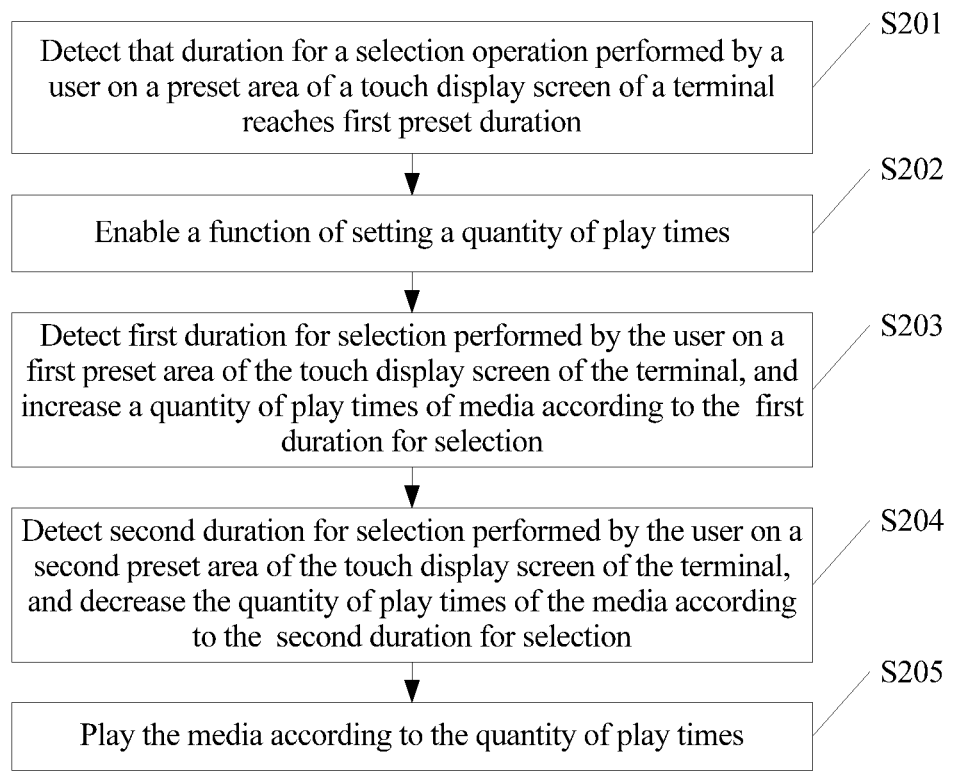
FIG. 2 is a schematic flowchart of a second embodiment of a method for playing media according to the present disclosure.

Referring to FIG. 2, FIG. 2 is a schematic flowchart of a second embodiment of a method for playing media according to the present disclosure. In this embodiment, the method includes the following.

The method shown in FIG. 2 includes S201. Detect that duration for a selection operation performed by a user on a preset area of a touch display screen of the terminal reaches first preset duration.

The method shown in FIG. 2 includes S202. Enable a function of setting a quantity of play times.

For S201 and S202, reference may be made to the foregoing corresponding description, and details are not described herein again.

The method shown in FIG. 2 includes S203. Detect first duration for selection performed by the user on a first preset area of the touch display screen of the terminal, and increase a quantity of play times of the media according to the first duration for selection.

Herein, when it is detected that the user selects the first preset area, it is determined that a quantity of play times of the media increases. In specific implementation, the first preset area may be a button that represents an increase in a quantity of times, for example, a plus button.

After S203, if the user stops input, the terminal may directly jump to S205. Optionally, if the user finds that the set quantity of play times is too large, and the quantity of play times needs to be decreased, the terminal may perform S204.

The method shown in FIG. 2 includes S204. Detect second duration for selection performed by the user on a second preset area of the touch display screen of the terminal, and decrease the quantity of play times of the media according to the second duration for selection.

Herein, when it is detected that the user selects the second preset area, it is determined that the quantity of play times of the media decreases. The first preset area may be a button that represents a decrease in a quantity of times, for example, a minus button. When obtaining a satisfactory quantity of play times, the user stops input on the second preset area. When the terminal does not detect subsequent input from the user, S205 is performed.

The method shown in FIG. 2 includes S205. Play the media according to the quantity of play times.

For a process of performing S205, reference may be made to the foregoing description, and details are not described herein again.

It should be noted that after the function of setting a quantity of play times is enabled, an initial quantity of play times may be 0 or 1. In this case, the user may input a number on the first preset area, and the terminal performs S203. Alternatively, an initial quantity of play times may be a relatively large number, for example, 5. In this case, the user may directly input a number on the second preset area. That is, after S202, S204 is directly performed without performing S203. It may be understood that S204 may also be first performed, and then S203 is performed.

The foregoing method may be performed by a terminal, or a specific module in a terminal. For details, reference may be made to a related apparatus embodiment.

Figure 3:
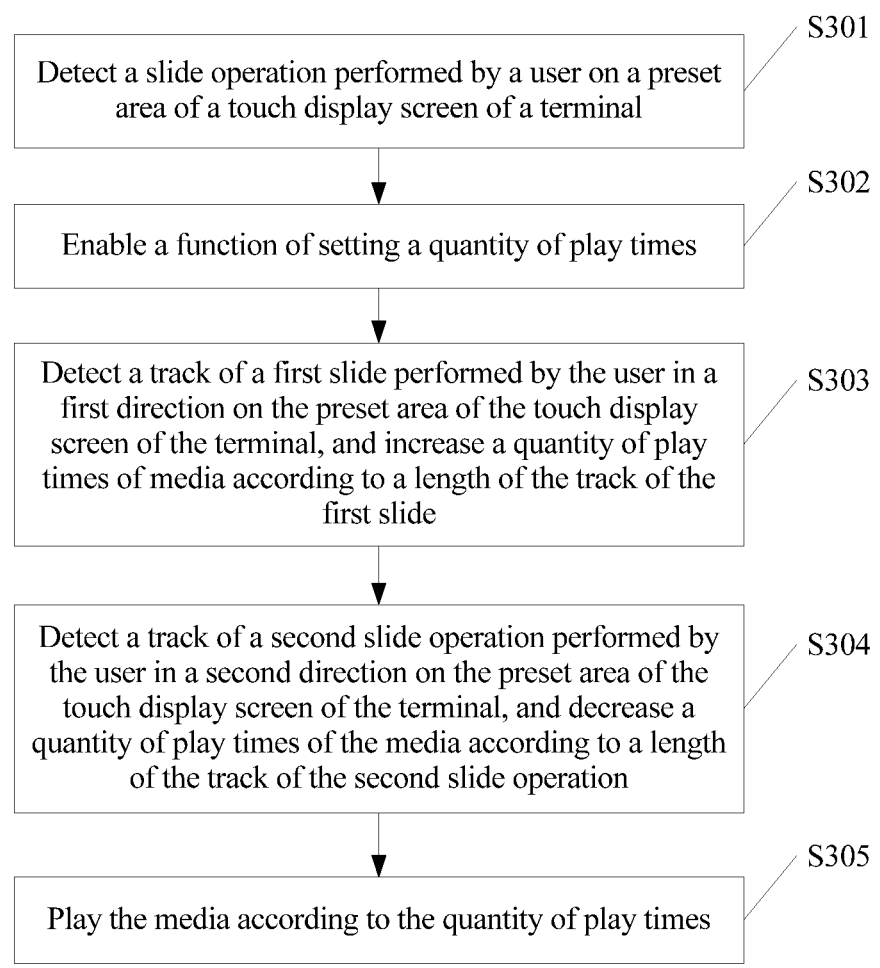
FIG. 3 is a schematic flowchart of a third embodiment of a method for playing media according to the present disclosure.

Referring to FIG. 3, FIG. 3 is a schematic flowchart of a third embodiment of a method for playing media according to the present disclosure. In this embodiment, the method includes the following.

The method shown in FIG. 3 includes S301. Detect a slide operation performed by a user on a preset area of a touch display screen of the terminal.

The method shown in FIG. 3 includes S302. Enable a function of setting a quantity of play times.

For S301 and S302, reference may be made to the foregoing corresponding description, and details are not described herein again.

The method shown in FIG. 3 includes S303. Detect a track of a first slide operation performed by the user in a first direction on the preset area of the touch display screen of the terminal, and increase a quantity of play times of media according to a length of the track of the first slide operation.

Similar to S203, when the first slide operation of the user is detected and according to the track of the first slide operation, it is determined that a quantity of play times of the media increases. In specific implementation, the preset area may be a bar area. If the bar area is in a direction parallel with a lateral axis of the touch display screen, the first direction may be a rightward direction along the bar area. If the bar area is in a direction parallel with a longitudinal axis of the touch display screen, the first direction may be an upward direction along the bar area. If a longer track slid by the user along the first direction is detected, a larger quantity of play times of the media is determined. When obtaining a satisfactory quantity of play times, the user stops the first slide operation. When the terminal does not detect subsequent input from the user, S305 may be directly jumped to. Optionally, if the user finds that the set quantity of play times is too large, and the quantity of play times needs to be decreased, the terminal may perform S304.

The method shown in FIG. 3 includes S304. Detect a track of a second slide operation performed by the user in a second direction on the preset area of the touch display screen of the terminal, and decrease a quantity of play times of the media according to a length of the track of the second slide operation.

Similar to S204, when the second slide operation of the user is detected and according to the track of the second slide operation, it is determined that the quantity of play times of the media decreases. In specific implementation, the preset area may be a bar area. If the bar area is in a direction parallel with a lateral axis of the touch display screen, the second direction may be a leftward direction along the bar area. If the bar area is in a direction parallel with a longitudinal axis of the touch display screen, the second direction may be a downward direction along the bar area. If a longer track slid by the user along the second direction, a smaller quantity of play times of the media is determined. When obtaining a satisfactory quantity of play times, the user stops the second slide operation. When the terminal does not detect subsequent input from the user, S305 may be performed.

The method shown in FIG. 3 includes S305. Play the media according to the quantity of play times.

For a process of performing S305, reference may be made to the foregoing description, and details are not described herein again.

It should be noted that after the function of setting a quantity of play times is enabled, an initial quantity of play times may be 0 or 1. In this case, the user inputs the first slide operation, and the terminal performs S303. Alternatively, an initial quantity of play times may be a relatively large number, for example, 5. In this case, the user may input the second slide operation, that is, after S302, S304 is directly performed without performing S303. It may be understood that S304 may also be first performed, and then S303 is performed.

The foregoing method may be performed by a terminal, or a specific module in a terminal. For details, reference may be made to a related apparatus embodiment.

Figure 4:
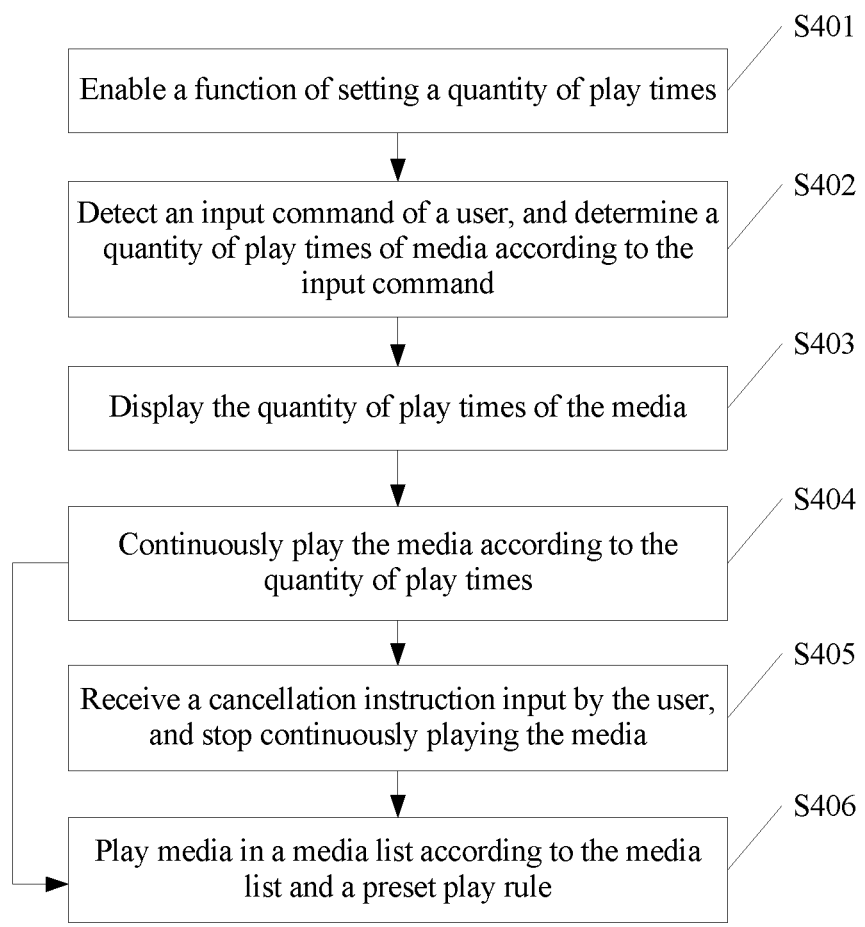
FIG. 4 is a schematic flowchart of a fourth embodiment of a method for playing media according to the present disclosure.

Referring to FIG. 4, FIG. 4 is a schematic flowchart of a fourth embodiment of a method for playing media according to the present disclosure. In this embodiment, the method includes the following steps.

The method shown in FIG. 4 includes S401. Enable a function of setting a quantity of play times.

The method shown in FIG. 4 includes S402. Detect an input command of a user, and determine a quantity of play times of media according to the input command.

For S401 and S402, reference may be made to the foregoing related description.

The method shown in FIG. 4 includes S403. Display the quantity of play times of the media.

Optionally, the quantity of play times of the media may be displayed on a touch display screen of a terminal, or may be displayed on another display screen of a terminal, for example, a display screen used for displaying time and date, or may be displayed on another display device connected to a terminal, and the determined quantity of play times is displayed on the touch display screen of the terminal in real time, which helps the terminal to prompt a currently set quantity of play times to a user, facilitates the user in performing corresponding control, so that the terminal obtains an optimum quantity of play times.

Certainly, in addition to displaying a currently determined quantity of play times in real time, a quantity of play times that is determined in real time during an operation may only be saved but not displayed, and after the quantity of play times is finally determined after the operation, a final quantity of play times is displayed on the touch display screen.

The method shown in FIG. 4 includes S404. Continuously play the media according to the quantity of play times.

The method shown in FIG. 4 includes S405. Receive a cancellation instruction input by the user, and stop continuously playing the media.

For example, a currently set quantity of play times is 5, and the media are played twice, or the media are being played for the second time. If the cancellation instruction input by the user is received at this time, after the media are played for the second time, and for the remaining three times, the media are not played.

Optionally, the cancellation instruction may be obtained by the terminal by detecting an operation performed by the user on the terminal, where the operation may be any operation executed on the touch display screen of the terminal or an operation that can be sensed by the terminal, for example, double-tapping an area of the touch display screen. Certainly, the user can directly tap a previous song or a next song in a music play application to directly cancel a set quantity of play times and directly play another media. The foregoing manner may also be considered as tapping a preset area of the touch display screen of the terminal by using a tap operation to achieve a purpose that the terminal cancels the set quantity of play times.

The method shown in FIG. 4 includes S406. Play media in a media list according to the media list and a preset play rule.

After S405, continuous play of the foregoing continuously played media is stopped, and subsequently, the media in the media list may be continuously played according to the media list and the preset play rule. For example, in the media play list, the following is already set: media 1, 2, 3, and 4 are to be played in order, and it is previously set that media 2 needs to be played for five times. If the media 2 are being played for the second time, and the cancellation instruction input by the user is received, after the media 2 is played for the second time, the following media 3 and 4 are directly played in order. Alternatively, after the cancellation instruction is received, play of the media may be paused or stopped. For details, reference may be made to a related solution in the prior art, which is not limited in the present disclosure.

It may be understood that continuously playing in the foregoing steps may be replaced with discontinuously playing, and implementation solutions thereof are similar.

In this embodiment, the entire play method is completely described. A determined quantity of play times is displayed on a touch display screen of a terminal, which helps the terminal to prompt a currently set quantity of play times to a user, facilitates the user in performing corresponding control, so that the terminal obtains a desired quantity of play times. When the play is completed according to a set quantity of play times, the terminal plays media in a media list according to the media list and a preset rule. For example, the preset rule is random play, and after the play, songs in a song list are to be randomly played; if the preset rule is play in order, after the play, a next song in a song list is to be played. Certainly, alternatively, the preset rule may be repeated play, and in this case, the user may also enable a function of setting a quantity of play times, so that after media are played for a set quantity of play times, the media continue to be played according to the rule of repeated play.

After steps S404 and S405, the terminal may directly perform step S406, thereby implementing perfect combination and compatibility of a normal play status and a set quantity of play times of media.

The foregoing method may be performed by a terminal, or a specific module in a terminal. For details, reference may be made to a related apparatus embodiment.

With reference to a display interface of a music play application, the following uses examples to describe a play method in the present disclosure.

Figure 5:
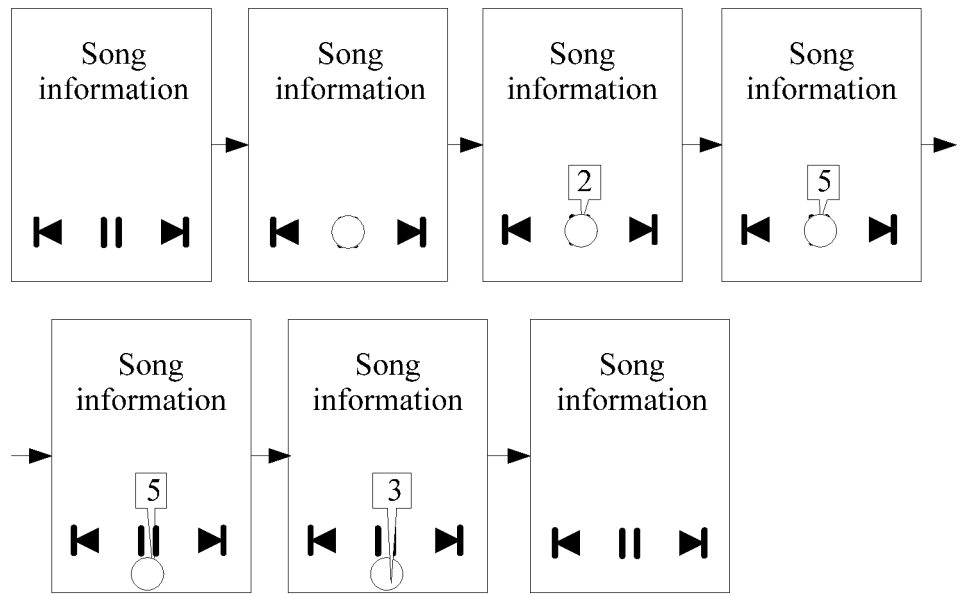
FIG. 5 is a schematic diagram of a display interface when the method for playing media in FIG. 2 is used for performing an operation.

Referring to FIG. 5, FIG. 5 is a schematic diagram of a display interface when the play method in FIG. 2 is used for performing an operation. As shown in FIG. 5, all operations of a user are completed on a display interface of a music play application. Song information, for example, information such as a song name, song duration, and lyrics, may be invoked for displaying on an upper half of the display interface. Each operation button, for example, "previous", "pause/play", and "next" may be displayed on a lower half of the display interface, and an area touched or selected by the user is represented by a black circle. In this embodiment, the user may touch and select the "pause/play" button for first preset duration, so as to trigger a function of setting a quantity of play times. If the user continues touching or selecting based on the first preset duration, the terminal determines a quantity of play times according to duration for touching or selecting the "pause/play" button and displays the quantity of play times in a form of a number. The number may be included in a square bubble or a circular bubble, and a display position may be above a touched or selected area, or may be adaptively adjusted according to a size of a touch display screen or a position of a function button of a current interface, or use another specific prompting manner, for example, by configuring a sound or flash form, which is not limited herein. As shown in the third display interface diagram in the first row, it is detected that a determined quantity of play times is "2" and is displayed above a near area of the "pause/play" button. If the user continues selecting and touching the "pause/play" button, the quantity of play times may continuously increase, and as shown on the fourth display interface diagram in the first row, the quantity of play times increases to "5". In this case, if the user thinks that the quantity of play times is satisfactory, the user may no longer touch or select a preset area of the touch display screen of the terminal. A quantity of play times that is determined by the terminal is 5, and the terminal continuously plays a current song for five times. If the quantity of play times increases to 5, and the user thinks that the quantity of times is relatively large, the user may slide downwards for a preset length, and in this case, the quantity of play times is still 5 (as shown on the first display interface diagram in the second row). In this case, a bubble for displaying the quantity of play times may be displayed above the "pause/play" button far away from the touched or selected area, which avoids covering the "pause/play" button. If the user continues touching and selecting after a downward slide, a user-defined quantity of play times decreases as duration for touch or selection increases. If the user thinks that repeatedly playing for three times is better, the user may stop a current operation when a current quantity of play times that is displayed by the terminal is 3 (as shown in the second display interface diagram in the second row), and in this case, if the terminal no longer detects any input operation, related to setting a quantity of play times, of the user, a quantity of play times that is determined by the terminal is 3, and the terminal starts to continuously play the current song for three times (as shown on the third display interface diagram in the second row).

The foregoing continuously playing may be replaced with discontinuously playing, and implementation solutions thereof are similar.

Figure 6:
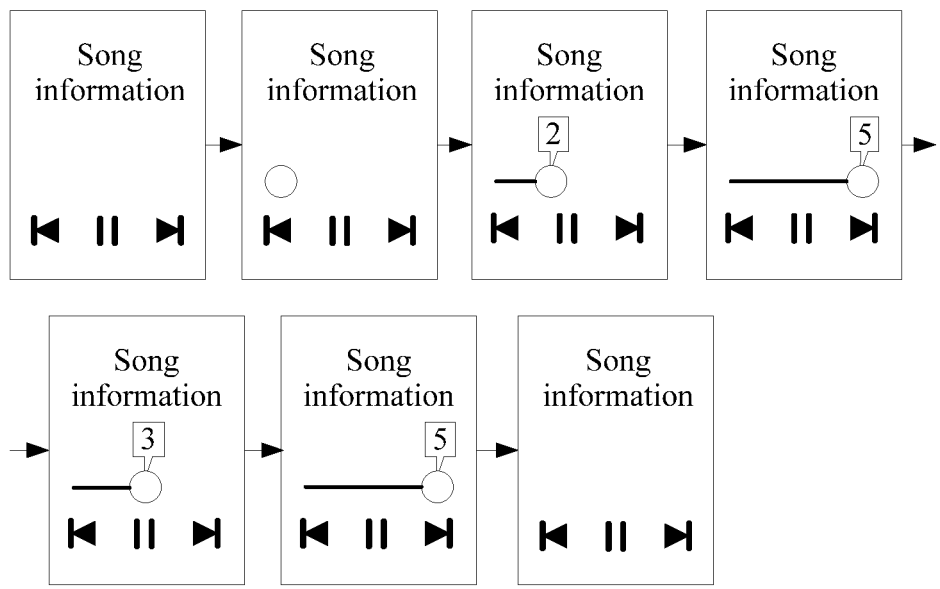
FIG. 6 is a schematic diagram of another display interface when the method for playing media in FIG. 3 is used for performing an operation.

Referring to FIG. 6, FIG. 6 is a schematic diagram of another display interface when the play method in FIG. 3 is used for performing an operation. As shown in FIG. 6, all operations are completed on a display interface of a music play application. Song information, for example, information such as a song name, song duration, and lyrics, may be invoked for displaying on an upper half of the display interface. Each operation button, for example, "previous", "pause/play", and "next", may be displayed on a lower half of the display interface, and an area touched or selected by a user is represented by a black circle. A slide track is represented by a black straight line using a touched or selected area as an end point, and a length of the slide track is a length of the black straight line. In this embodiment, the user may slide rightwards above each operation button for a preset length, so as to trigger a function of setting a quantity of play times. If the user continues sliding rightwards based on the preset length, the terminal starts to determine, according to detection, a quantity of play times and displays the quantity of play times in a form of a number, and a specific prompting manner may further be configured to be a sound or flash form, which is not limited herein. As shown on the third display interface diagram in the first row, it is detected that a determined quantity of play times is "2". If the user continues sliding rightwards, the quantity of play times may continuously increase, and as shown on the fourth display interface diagram in the first row, the quantity of play times increases to "5". In this case, if the user thinks that the quantity of play times is satisfactory, the user may no longer touch or select a preset area of the touch display screen of the terminal. A quantity of play times that is determined by the terminal is 5, and the terminal continuously plays a current song for five times. If the quantity of play times increases to 5, and the user thinks that the quantity of times is relatively large, the user may slide leftwards for a specific length, and in this case, the quantity of play times decreases to 3 (as shown on the first display interface diagram in the second row); if the user slides rightwards, the quantity of play times increases to 5 again (as shown on the second display interface diagram in the second row). If the user thinks that playing for five times is better, the user may stop a current operation when the terminal displays that a current quantity of play times is 5, and in this case, if the terminal no longer detects any input operation, related to setting a quantity of play times, of the user, a quantity of play times that is determined by the terminal is 5, and the terminal starts to continuously play the current song for five times (as shown on the third display interface diagram in the second row). The foregoing continuously playing may be replaced with discontinuously playing, and implementation solutions thereof are similar.

It should be noted that in FIG. 5 and FIG. 6, operations of touch and hold, and a slide and combination thereof are used to achieve an effect of user-defining of a quantity of play times. The quantity of play times can also be set by performing another operation. For example, a double tap on a touch display screen may enable a function of setting a quantity of play times, and then the quantity of play times is determined according to a quantity of times of tapping the touch display screen. Certainly, if an adjusting function of decreasing a quantity of times needs to be configured, two display areas of the touch display screen may be correspondingly configured for corresponding to increase and decrease functions respectively, and the quantity of play times may be increased or decreased by tapping a corresponding area. Alternatively, user-defining of a quantity of play times may be triggered in a gravity sensing manner by shaking the terminal, and a function of setting a quantity of play times may be implemented in a manner, such as configuring that a horizontal shake increases the quantity of play times and a vertical shake decreases the quantity of play times, which is not limited in the present disclosure.

Figure 7:
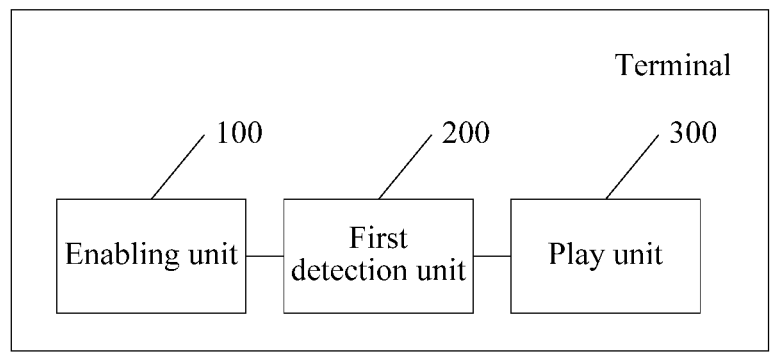
FIG. 7 is a schematic diagram of composition of a first embodiment of a terminal for playing media according to the present disclosure.

Referring to FIG. 7, FIG. 7 is a schematic diagram of composition of a first embodiment of a terminal for playing media according to the present disclosure. In this embodiment, the terminal includes:

an enabling unit 100, configured to enable a function of setting a quantity of play times;

a first detection unit 200, configured to detect an input command of a user, and determine a quantity of play times of media according to the input command; and a play unit 300, configured to play the media according to the quantity of play times. Optionally, the media include:

an audio file or a video file that is currently being played by the terminal; and the play unit 300 is configured to:

play the audio file or the video file that is currently being played by the terminal, until the quantity of play times is reached.

Alternatively, the media include:

a selected to-be-played audio file or a selected to-be-played video file; and the play unit 300 is configured to:

play the selected to-be-played audio file or the selected to-be-played video file, until the quantity of play times is reached.

The first detection unit 200 is configured to perform any one of the following steps:

detecting a quantity of play times that is input by the user by using a voice, and determining that the quantity of play times of the media is the quantity of play times that is input by using a voice;

detecting a quantity of fingers of the user that touch a preset area of a touch display screen of the terminal, and determining that the quantity of play times of the media is the quantity of fingers;

detecting a quantity of times of shaking the terminal by the user, and determining that the quantity of play times of the media is the quantity of times of shaking the terminal by the user;

detecting a quantity of times of tapping a preset area of a touch display screen of the terminal by the user, and determining that the quantity of play times of the media is the quantity of tap times;

detecting a track of a slide operation performed by the user on a preset area of a touch display screen of the terminal, and determining the quantity of play times of the media according to a length of the track of the slide operation or according to a length and a direction that are of the track;

detecting duration for selection performed by the user on a preset area of a touch display screen of the terminal, and determining the quantity of play times of the media according to the duration for selection; and detecting a distance between two points selected by the user on a preset area of a touch display screen of the terminal, and determining the quantity of play times of the media according to the distance.

Figure 8:
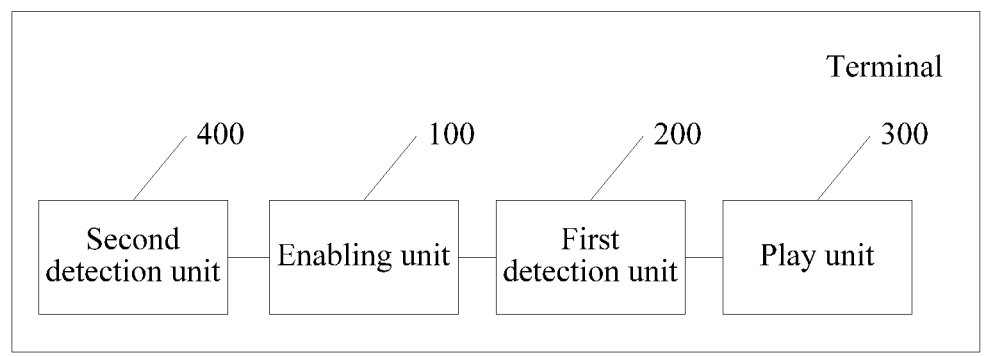
FIG. 8 is a schematic diagram of composition of a second embodiment of a terminal for playing media according to the present disclosure.

Referring to FIG. 8, FIG. 8 is a schematic diagram of composition of a second embodiment of a terminal for playing media according to the present disclosure. In this embodiment, the terminal includes:

an enabling unit 100, configured to enable a function of setting a quantity of play times;

a first detection unit 200, configured to detect an input command of a user, and determine a quantity of play times of media according to the input command; and a play unit 300, configured to play the media according to the quantity of play times.

Optionally, the terminal further includes a second detection unit 400, configured to: before the enabling unit 100 enables the function of setting a quantity of play times, perform at least one of the following steps:

detecting a preset command that is input by the user by using a voice;

detecting that a movement track of the terminal is in line with a preset track;

detecting a tap operation performed by the user on a preset area of a touch display screen of the terminal;

detecting a knock operation performed by the user on the terminal;

detecting a slide operation performed by the user on a preset area of a touch display screen of the terminal;

detecting that duration for a selection operation performed by the user on a preset area of a touch display screen of the terminal reaches first preset duration;

detecting a pressing operation performed by the user on a specified key of the terminal; and detecting that a quantity of fingers of the user that touch a preset area of a touch display screen of the terminal reaches a preset quantity.

The first detection unit 200 is configured to perform any one of the following steps:

detecting a quantity of play times that is input by the user by using a voice, and determining that the quantity of play times of the media is the quantity of play times that is input by using a voice;

detecting the quantity of fingers of the user that touch the preset area of the touch display screen of the terminal, and determining that the quantity of play times of the media is the quantity of fingers;

detecting a quantity of times of shaking the terminal by the user, and determining that the quantity of play times of the media is the quantity of times of shaking the terminal by the user;

detecting a quantity of times of tapping the preset area of the touch display screen of the terminal by the user, and determining that the quantity of play times of the media is the quantity of tap times;

detecting a track of the slide operation performed by the user on the preset area of the touch display screen of the terminal, and determining the quantity of play times of the media according to a length of the track of the slide operation or according to a length and a direction that are of the track;

detecting duration for selection performed by the user on the preset area of the touch display screen of the terminal, and determining the quantity of play times of the media according to the duration for selection; and detecting a distance between two points selected by the user on the preset area of the touch display screen of the terminal, and determining the quantity of play times of the media according to the distance.

Optionally, before the enabling unit 100 enables the function of setting a quantity of play times, the second detection unit 400 is configured to:

detect that duration for a selection operation performed by the user on a preset area of a touch display screen of the terminal reaches first preset duration; and the first detection unit 200 is configured to continuously detect the selection operation performed by the user on the preset area of the touch display screen of the terminal, and determine the quantity of play times of the media according to the duration for the selection operation.

Optionally, before the enabling unit 100 enables the function of setting a quantity of play times, the second detection unit 400 is configured to detect a slide operation performed by the user on a preset area of a touch display screen of the terminal; and the first detection unit 200 is configured to continuously detect the slide operation performed by the user on the preset area of the touch display screen of the terminal; and adjust the quantity of play times of the media according to a direction and a length that are of a track of the slide operation.

Optionally, when detecting the input command of the user and determining the quantity of play times of the media according to the input command, the first detection unit 200 detects a first operation of the user, and before the enabling unit 100 enables the function of setting a quantity of play times, the second detection unit 400 detects a second operation of the user. The two operations are of a same type and continuous in time.

Figure 9:
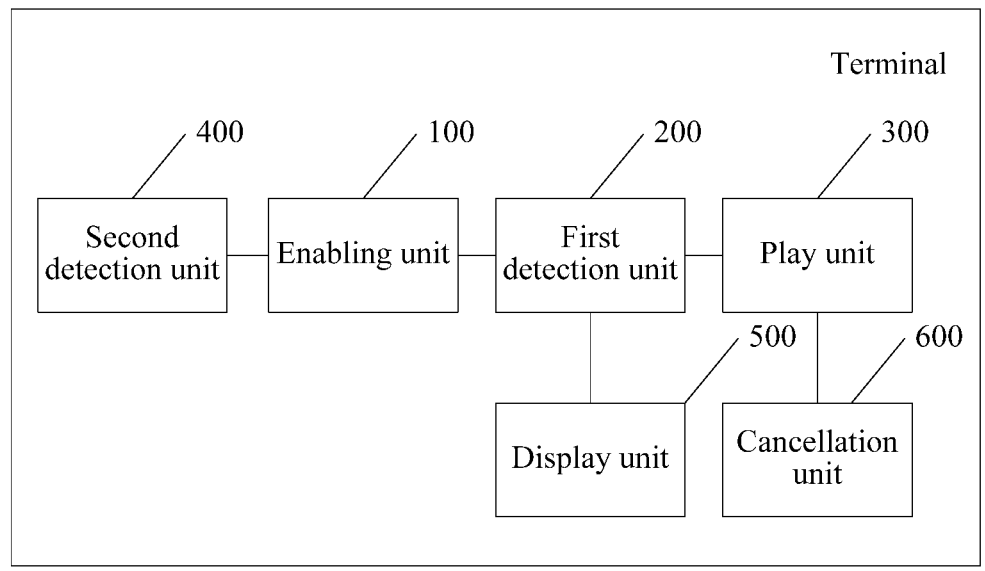
FIG. 9 is a schematic diagram of composition of a third embodiment of a terminal for playing media according to the present disclosure.

Referring to FIG. 9, FIG. 9 is a schematic diagram of composition of a third embodiment of a terminal for playing media according to the present disclosure. In this embodiment, the terminal includes:

an enabling unit 100, configured to enable a function of setting a quantity of play times;

a first detection unit 200, configured to detect an input command of a user, and determine a quantity of play times of media according to the input command; and a play unit 300, configured to play the media according to the quantity of play times.

Optionally, the terminal further includes a second detection unit 400, configured to: before the enabling unit 100 enables the function of setting a quantity of play times, perform at least one of the following steps:

detecting a preset command that is input by the user by using a voice;

detecting that a movement track of the terminal is in line with a preset track;

detecting a tap operation performed by the user on a preset area of a touch display screen of the terminal;

detecting a knock operation performed by the user on the terminal;

detecting a slide operation performed by the user on a preset area of a touch display screen of the terminal;

detecting that duration for a selection operation performed by the user on a preset area of a touch display screen of the terminal reaches first preset duration;

detecting a pressing operation performed by the user on a specified key of the terminal; and detecting that a quantity of fingers of the user that touch a preset area of a touch display screen of the terminal reaches a preset quantity.

The first detection unit 200 is configured to perform any one of the following steps:

detecting a quantity of play times that is input by the user by using a voice, and determining that the quantity of play times of the media is the quantity of play times that is input by using a voice;

detecting the quantity of fingers of the user that touch the preset area of the touch display screen of the terminal, and determining that the quantity of play times of the media is the quantity of fingers;

detecting a quantity of times of shaking the terminal by the user, and determining that the quantity of play times of the media is the quantity of times of shaking the terminal by the user;

detecting a quantity of times of tapping the preset area of the touch display screen of the terminal by the user, and determining that the quantity of play times of the media is the quantity of tap times;

detecting a track of the slide operation performed by the user on the preset area of the touch display screen of the terminal, and determining the quantity of play times of the media according to a length of the track of the slide operation or according to a length and a direction that are of the track;

detecting duration for selection performed by the user on the preset area of the touch display screen of the terminal, and determining the quantity of play times of the media according to the duration for selection; and detecting a distance between two points selected by the user on the preset area of the touch display screen of the terminal, and determining the quantity of play times of the media according to the distance.

The terminal further includes:

a display unit 500, configured to: after the first detection unit 200 determines the quantity of play times of the media, display the quantity of play times of the media; and a cancellation unit 600, configured to: when the play unit 300 is playing the media according to the quantity of play times, if a cancellation instruction input by the user is received, stop playing of the media that is performed according to the quantity of play times.

After the play unit 300 plays the media according to the quantity of play times, or after the cancellation unit 600 receives the cancellation instruction input by the user and stops playing of the media that is performed according to the quantity of play times, the play unit 300 is further configured to play media in a media list according to the media list and a preset play rule.

It should be noted that the enabling unit 100, the first detection unit 200, the play unit 300, the display unit 500, the play unit 300, the display unit 500, or the cancellation unit 600 above may be disposed independently or in an integrated manner. In addition, the enabling unit 100, the first detection unit 200, the play unit 300, the display unit 500, and the cancellation unit 600, the play unit 300, the display unit 500, and the cancellation unit 600 above may be separately disposed independently of a processor of the terminal in a form of hardware, may be separately disposed, or may be disposed in an integrated manner as a microprocessor; may be built into a processor of the terminal, or may be stored in a memory of the terminal in a form of software, so that the processor of the terminal invokes and performs operations corresponding to the enabling unit 100, the first detection unit 200, the play unit 300, the display unit 500, and the cancellation unit 600, the play unit 300, the display unit 500, and the cancellation unit 600 above.

For example, in a first embodiment (the embodiment shown in FIG. 7) of the terminal for playing media of the present disclosure, the a starting unit may be a processor of the terminal, and functions of the first detection unit and the play unit 300 may be built into the processor, or separately disposed independently of the processor, or stored in a memory in a form of software. The functions of the first detection unit 200 and the play unit 300 are invoked and implemented by the processor. The play unit 300 is used as a media playing apparatus and controlled by the enabling unit 100. In a second embodiment (the embodiment shown in FIG. 8) of the terminal for playing media of the present disclosure, the second detection unit 400 is further included. The second detection unit 400 may be integrated with the first detection unit 200 or independently disposed, or may be used as an interface circuit of the terminal and configured to detect a user operation and perform identification, and may be independently disposed or integrated with the processor. In a third embodiment shown in FIG. 9, the play unit 500 may be used as an output apparatus of the terminal, and the cancellation unit 600 may be integrated with the enabling unit 100 or independently disposed, which is not limited in this embodiment of the present disclosure. The foregoing processor may be a central processing unit (CPU), a microprocessor, a single-chip microcomputer, or the like.

Figure 10:
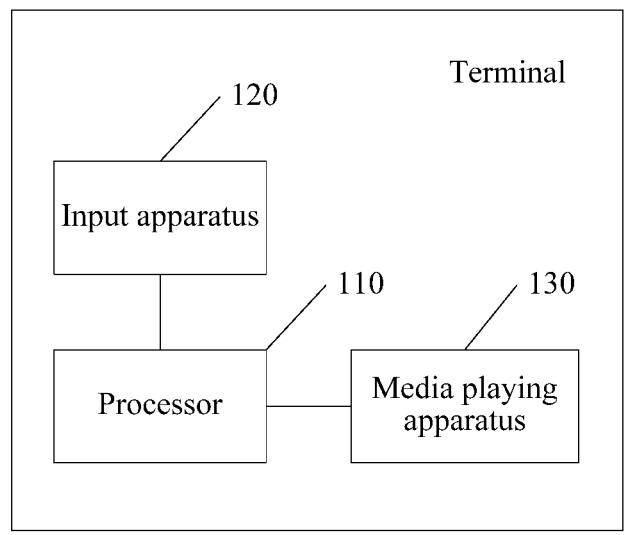
FIG. 10 is a schematic diagram of composition of a fourth embodiment of a terminal for playing media according to the present disclosure.

Referring to FIG. 10, FIG. 10 is a schematic diagram of composition of a fourth embodiment of a terminal for playing media according to the present disclosure. In this embodiment, the terminal includes:

a processor 110, configured to enable a function of setting a quantity of play times;

an input apparatus 120, configured to detect an input command of a user, where the processor 110 is further configured to determine a quantity of play times of media according to the input command, and instruct a media output apparatus 140 to play the media according to the quantity of play times; and the media playing apparatus 130, configured to play the media according to the quantity of play times.

Optionally, the media include:

an audio file or a video file that is currently being played by the terminal; and the media playing apparatus 130 is configured to:

play the audio file or the video file that is currently being played by the terminal, until the quantity of play times is reached.

Alternatively, the media include:

a selected to-be-played audio file or a selected to-be-played video file; and the media playing apparatus 130 is configured to:

play the selected to-be-played audio file or the selected to-be-played video file, until the quantity of play times is reached.

Optionally, when the function of setting a quantity of play times is triggered, the input apparatus 120 is further configured to:

before the processor 110 enables the function of setting a quantity of play times, perform at least one of the following steps:

detecting a preset command that is input by the user by using a voice, in which case the input apparatus 120 may be a microphone;

detecting that a movement track of the terminal is in line with a preset track, in which case the input apparatus 120 may be one or more types of sensors, such as an acceleration sensor, a gyro sensor, or an electronic compass sensor;

detecting a tap operation performed by the user on a preset area of a touch display screen of the terminal, in which case the input apparatus 120 may be a touch display screen;

detecting a knock operation performed by the user on the terminal, in which case the input apparatus 120 may be a touch display screen;

detecting a slide operation performed by the user on a preset area of a touch display screen of the terminal, in which case the input apparatus 120 may be a touch display screen;

detecting that duration for a selection operation performed by the user on a preset area of a touch display screen of the terminal reaches first preset duration, in which case the input apparatus 120 may be a touch display screen;

detecting a pressing operation performed by the user on a specified key of the terminal, in which case the input apparatus 120 may be a touch display screen or a signal transmission circuit connected to the key; and detecting that a quantity of fingers of the user that touch a preset area of a touch display screen of the terminal reaches a preset quantity, in which case the input apparatus 120 may be a touch display screen.

When the quantity of play times is being determined, the input apparatus 120 is configured to detect a quantity of play times that is input by the user by using a voice, and the processor 110 is configured to determine that the quantity of play times of the media is the quantity of play times that is input by using a voice; or the input apparatus 120 is configured to detect the quantity of fingers of the user that touch the preset area of the touch display screen of the terminal, and the processor 110 is configured to determine that the quantity of play times of the media is the quantity of fingers; or the input apparatus 120 is configured to detect a quantity of times of shaking the terminal by the user, and the processor 110 is configured to determine that the quantity of play times of the media is the quantity of times of shaking the terminal by the user; or the input apparatus 120 is configured to detect a quantity of times of tapping the preset area of the touch display screen of the terminal by the user, and the processor 110 is configured to determine that the quantity of play times of the media is the quantity of tap times; or the input apparatus 120 is configured to detect a track of the slide operation performed by the user on the preset area of the touch display screen of the terminal, and the processor 110 is configured to determine the quantity of play times of the media according to a length of the track of the slide operation or according to a length and a direction that are of the track; or the input apparatus 120 is configured to detect duration for selection performed by the user on the preset area of the touch display screen of the terminal, and the processor 110 is configured to determine the quantity of play times of the media according to the duration for selection; or the input apparatus 120 is configured to detect a distance between two points selected by the user on the preset area of the touch display screen of the terminal, and the processor 110 is configured to determine the quantity of play times of the media according to the distance.

Optionally, the input apparatus 120 is configured to:

detect that duration for a selection operation performed by the user on a preset area of a touch display screen of the terminal reaches first preset duration;

the processor 110 is configured to:

after the input apparatus 120 detects that the duration for the selection operation performed by the user on the preset area of the touch display screen of the terminal reaches the first preset duration, enable the function of setting a quantity of play times;

the input apparatus 120 is configured to:

continuously detect the selection operation performed by the user on the preset area of the touch display screen of the terminal; and the processor 110 is configured to:

determine the quantity of play times of the media according to the duration for the selection operation.

Optionally, the input apparatus 120 is configured to:

detect a slide operation performed by the user on a preset area of a touch display screen of the terminal;

the processor 110 is configured to:

after the input apparatus 120 detects the slide operation performed by the user on the preset area of the touch display screen of the terminal, enable the function of setting a quantity of play times;

the input apparatus 120 is configured to:

continuously detect the slide operation performed by the user on the preset area of the touch display screen of the terminal; and the processor 110 is configured to:

adjust the quantity of play times of the media according to a direction and a length that are of a track of the slide operation.

Optionally, when the input apparatus 120 detects the input command of the user and the processor 110 determines the quantity of play times of the media according to the input command, the input apparatus 120 detects a first operation of the user, and before the processor 110 enables the function of setting a quantity of play times, the input apparatus 120 detects a second operation of the user, where the two operations are of a same type and continuous in time.

The terminal further includes a display screen 140 (not shown in the figure), configured to: after the processor 110 determines the quantity of play times of the media, display the quantity of play times of the media.

The input apparatus 120 is further configured to: when the media playing apparatus 130 is playing the media according to the quantity of play times, receive a cancellation instruction input by the user;

the processor 110 is further configured to instruct the media playing apparatus to stop playing of the media that is performed according to the quantity of play times; and the media playing apparatus 130 is further configured to stop, according to the instruction of the processor 110, playing of the media that is performed according to the quantity of play times.

After the media playing apparatus 130 plays the media according to the quantity of play times, or after the input apparatus 120 receives the cancellation instruction input by the user, and the processor 110 instructs the media playing apparatus 130 to stop playing of the media that is performed according to the quantity of play times, the media playing apparatus 130 is further configured to play media in a media list according to the media list and a preset play rule.

It should be noted that the embodiments of this specification are described in a progressive manner. The description of each embodiment focuses on its difference from other embodiments. For same or similar parts of the embodiments, reference may be made to each other. For an apparatus embodiment, the apparatus embodiment is described briefly because it is basically similar to the method embodiment; for relevant parts, reference may be made to a part of description of the method embodiment.

According to descriptions of the foregoing embodiments, the present disclosure has the following advantages.

A function of setting a quantity of play times is configured on a terminal, a quantity of play times of media is determined according to a detected input command of a user, and finally the media are played according to the determined quantity of play times, which improves an existing method for playing media on a terminal, resolves a problem that an operation of the terminal is relatively complex when same media need to be repeatedly played, enables a quantity of play times of the media to be directly and conveniently set, and enhances convenience and usability of the terminal.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM for short), a random access memory (RAM for short), or the like.

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A method, comprising:

playing an audio file or a video file in response to a second selection operation performed by a user on a pause/play button of a media play application displayed on a touch display screen of a terminal, the audio file or the video file is displayed as currently being played by the terminal in response to the second selection operation, the second selection operation comprises touching the pause/play button;

detecting that a duration of a first selection operation performed by a user on the pause/play button of the media play application displayed on the touch display screen of the terminal reaches a first preset duration when the audio file or the video file is displayed as currently being played by the terminal, the first selection operation comprises holding the pause/play button, the duration of the first selection operation is a length of time the user holds the pause/play button during the first selection operation, and in response to the detecting that the duration of the first selection operation performed by the user on the pause/play button of the media play application displayed on the touch display screen of the terminal reaches the first preset duration, enabling a function of setting a quantity of play times of the audio file or the video file that is displayed as currently being played by the terminal, a duration of the second selection operation is less than the first preset duration;

continuously detecting the first selection operation performed by the user on the pause/play button of the media play application displayed on the touch display screen of the terminal, and determining the quantity of play times of the audio file or the video file that is displayed as currently being played by the terminal according to the duration of the first selection operation; and playing the audio file or the video file that is displayed as currently being played by the terminal according to the quantity of play times.

2. The method according to claim 1, wherein after determining the quantity of play times of the audio file or the video file that is displayed as currently being played by the terminal according to the duration of the first selection operation, the method further comprises:
displaying the quantity of play times of the audio file or the video file that is displayed as currently being played by the terminal.

3. The method according to claim 2, wherein the quantity of play times of the audio file or the video file that is displayed as currently being played is displayed in a square bubble or a circular bubble above the pause/play button.

4. The method according to claim 2, wherein an initial quantity of play times is 1, and the quantity of play times increases as the duration of the first selection operation increases.

5. The method according claim 1, wherein when the audio file or the video file that is displayed as currently being played by the terminal is being played according to the quantity of play times, and when a cancellation operation input by the user is received, playing of the audio file or the video file that is displayed as currently being played by the terminal is stopped.

6. The method according to claim 5, wherein the cancellation instruction comprises double-tapping an area of the touch display screen, or tapping a previous song or a next song button of the music play application.

7. The method according to claim 1, further comprising:
detecting a third selection operation performed by the user, the third selection operation comprises touching the pause/play button of the media play application and sliding downward;
decreasing the determined quantity of play times according to a length of sliding downward for the third selection operation;
displaying the decreased quantity of play times in a square bubble or a circular bubble above the pause/play button.

8. A terminal, comprising:
a processor; and
a non-transitory memory storing instructions that, when executed by the processor, cause the terminal to:
play an audio file or a video file in response to a second selection operation performed by a user on a pause/play button of a media play application displayed on a touch display screen of a terminal, the audio file or the video file is displayed as currently being played by the terminal in response to the second selection operation, the second selection operation comprises touching the pause/play button;
detect that a duration of a first selection operation performed by a user on the pause/play button of the media play application displayed on the touch display screen of the terminal reaches a first preset duration when the audio file or the video file is displayed as currently being played by the terminal, the first selection operation comprises holding the pause/play button, the duration of the first selection operation is a length of time the user holds the pause/play button during the first selection operation, and in response to detecting that the duration of the selection operation performed by the user on the pause/play button of the media play application displayed on the touch display screen of the terminal reaches the first preset duration, enabling a function of setting a quantity of play times of the audio file or the video file that is displayed as currently being played by the terminal, a duration of the second selection operation is less than the first preset duration;
continuously detect the first selection operation performed by the user on the pause/play button of the media play application displayed on the touch display screen of the terminal, and determine the quantity of play times of the audio file or the video file that is displayed as currently being played by the terminal according to the duration of the selection operation; and
play the audio file or the video file that is displayed as currently being played by the terminal according to the quantity of play times.

9. The terminal of claim 8, wherein the instructions, when executed by the processor, further cause the terminal to:
display the quantity of play times of the audio file or the video file that is displayed as currently being played by the terminal after determining the quantity of play times of the audio file or the video file that is displayed as currently being played by the terminal according to the duration of the first selection operation.

10. The terminal according to claim 9, wherein the quantity of play times of the audio file or the video file that is displayed as currently being played is displayed in a square bubble or a circular bubble above the pause/play button.

11. The terminal according to claim 9, wherein an initial quantity of play times is 1, and the quantity of play times increases as the duration of the first selection operation increases.

12. The terminal of claim 8, wherein the instructions, when executed by the terminal, further cause the terminal to:
when the audio file or the video file that is displayed as currently being played by the terminal is being played according to the quantity of play times, when a cancellation instruction operation input by the user is received, stop playing the audio file or the video file that is displayed as currently being played by the terminal.

13. The terminal according to claim 12, wherein the cancellation instruction comprises double-tapping an area of the touch display screen, or tapping a previous song or a next song button of the music play application.

14. The terminal according to claim 8, wherein the instructions, when executed by the processor, further cause the terminal to:
detect a third selection operation performed by the user, the third selection operation comprises touching the pause/play button of the media play application and sliding downward;
decrease the determined quantity of play times according to a length of sliding downward for the third selection operation;
display the decreased quantity of play times in a square bubble or a circular bubble above the pause/play button.

15. A non-transitory computer readable storage medium storing instructions that, when executed by one or more processors, cause a terminal to:
play an audio file or a video file in response to a second selection operation performed by a user on a pause/play button of a media play application displayed on a touch display screen of a terminal, the audio file or the video file is displayed as currently being played by the terminal in response to the second selection operation, the second selection operation comprises touching the pause/play button;
detect that a duration of a first selection operation performed by a user on the pause/play button of the media play application displayed on the touch display screen of the terminal reaches a first preset duration when the audio file or the video file is displayed as currently being played by the terminal, the first selection operation comprises holding the pause/play button, the duration of the first selection operation is a length of time the user holds the pause/play button during the first selection operation, and in response to detecting that the duration of the first selection operation performed by the user on the pause/play button of the media play application displayed on the touch display screen of the terminal reaches the first preset duration, enabling a function of setting a quantity of play times of the audio file or the video file that is displayed as currently being played by the terminal, a duration of the second selection operation is less than the first preset duration;

continuously detect the first selection operation performed by the user on the pause/play button of the media play application displayed on the touch display screen of the terminal, and determining the quantity of play times of the audio file or the video file that is displayed as currently being played by the terminal according to the duration of the first selection operation; and play the audio file or the video file that is displayed as currently being played by the terminal according to the quantity of play times.

16. The computer readable storage medium according to claim 15, wherein the instructions, when executed by the one or more processors, further cause the terminal to:

display the quantity of play times of the audio file or the video file that is displayed as currently being played by the terminal.

17. The non-transitory computer readable storage medium according to claim 16, wherein the quantity of play times of the audio file or the video file that is displayed as currently being played is displayed in a square bubble or a circular bubble above the pause/play button.

18. The computer readable storage medium according to claim 16, wherein the quantity of play times of the audio file or the video file that is displayed as currently being played is displayed in a square bubble or a circular bubble above the pause/play button.

19. The computer readable storage medium according to claim 18, wherein an initial quantity of play times is 1, and the quantity of play times increases as the duration of the first selection operation increases.

20. The non-transitory computer readable storage medium according to claim 15, wherein the instructions, when executed by the one or more processors, further cause the terminal to:

detect a third selection operation performed by the user, the third selection operation comprises touching the pause/play button of the media play application and sliding downward;

decrease the determined quantity of play times according to a length of sliding downward for the third selection operation;

display the decreased quantity of play times in a square bubble or a circular bubble above the pause/play button.

* * * * *

UNITED STATES PATENT AND TRADEMARK OFFICE
CERTIFICATE OF CORRECTION

| | | |
|---|---|---|
| PATENT NO. | : 10,540,074 B2 | Page 1 of 1 |
| APPLICATION NO. | : 15/109588 | |
| DATED | : January 21, 2020 | |
| INVENTOR(S) | : Jie Xu | |

It is certified that error appears in the above-identified patent and that said Letters Patent is hereby corrected as shown below:

In the Claims

In Column 32, Line 34, Claim 12, delete "instruction".

Signed and Sealed this
Seventeenth Day of September, 2024

Katherine Kelly Vidal
*Director of the United States Patent and Trademark Office*